(12) United States Patent
Xun et al.

(10) Patent No.: US 10,446,150 B2
(45) Date of Patent: Oct. 15, 2019

(54) IN-VEHICLE VOICE COMMAND RECOGNITION METHOD AND APPARATUS, AND STORAGE MEDIUM

(71) Applicant: Baidu Online Network Technology (Beijing) Co., Ltd., Beijing (CN)

(72) Inventors: Lihui Xun, Beijing (CN); Nengjun Ouyang, Beijing (CN); Xiangyu Mu, Beijing (CN)

(73) Assignee: Baidu Online Network Technology (Beijing) Co. Ltd., Beijing (CN)

( * ) Notice: Subject to any disclaimer, the term of this patent is extended or adjusted under 35 U.S.C. 154(b) by 94 days.

(21) Appl. No.: 15/738,946

(22) PCT Filed: Nov. 23, 2015

(86) PCT No.: PCT/CN2015/095269
§ 371 (c)(1),
(2) Date: Dec. 21, 2017

(87) PCT Pub. No.: WO2017/000489
PCT Pub. Date: Jan. 5, 2017

(65) Prior Publication Data
US 2018/0190283 A1    Jul. 5, 2018

(30) Foreign Application Priority Data
Jul. 2, 2015  (CN) .......................... 2015 1 0382215

(51) Int. Cl.
*G10L 15/22* (2006.01)
*G10L 25/51* (2013.01)
(Continued)

(52) U.S. Cl.
CPC .............. *G10L 15/22* (2013.01); *G10L 15/16* (2013.01); *G10L 15/1815* (2013.01);
(Continued)

(58) Field of Classification Search
CPC ..... G10L 15/22; G10L 15/16; G10L 15/1815; G10L 25/30; G10L 25/51; G10L 25/63
See application file for complete search history.

(56) References Cited

U.S. PATENT DOCUMENTS

2011/0112921 A1* 5/2011 Kennewick ........ G06Q 30/0601
                                                        705/26.1
2014/0163977 A1  6/2014 Hoffmeister
(Continued)

FOREIGN PATENT DOCUMENTS

CN       101149922 A    3/2008
CN       102411931 A    4/2012
(Continued)

OTHER PUBLICATIONS

International Search Report and Written Opinion of International Searching Authority for PCT/CN/2015/095269, with English translation (19 pages).
(Continued)

*Primary Examiner* — Mohammad K Islam
(74) *Attorney, Agent, or Firm* — Nixon Peabody LLP

(57) ABSTRACT

An in-vehicle voice command recognition method and apparatus, and a storage medium. The method includes: acquiring a voice command inputted by a user; determining basic information of the user according to a pre-trained deep neural network (DNN) model; identifying contents of the voice command according to the basic information of the user, and determining at least one potential user intention according to the identified contents and a scenario page context at the time when the user inputs the voice command; determining a confidence level of the potential user intention according to the DNN model; determining a real user intention from the potential user intention according to the confidence level; and executing a corresponding action according to the real user intention. The embodiments of the (Continued)

present disclosure can effectively improve the correct recognition rate of voice commands.

13 Claims, 6 Drawing Sheets

(51) Int. Cl.
*G10L 25/30* (2013.01)
*G10L 25/63* (2013.01)
*G10L 15/16* (2006.01)
*G10L 15/18* (2013.01)
*G10L 25/24* (2013.01)
*G10L 25/21* (2013.01)
*G10L 25/09* (2013.01)

(52) U.S. Cl.
CPC ............. *G10L 25/30* (2013.01); *G10L 25/51* (2013.01); *G10L 25/63* (2013.01); *G10L 25/09* (2013.01); *G10L 25/21* (2013.01); *G10L 25/24* (2013.01); *G10L 2015/223* (2013.01); *G10L 2015/227* (2013.01)

(56) References Cited

U.S. PATENT DOCUMENTS

| | | | |
|---|---|---|---|
| 2014/0222436 A1 | 8/2014 | Binder | |
| 2014/0257803 A1 | 9/2014 | Yu | |
| 2015/0120288 A1* | 4/2015 | Thomson | G10L 15/22 704/231 |
| 2015/0382047 A1* | 12/2015 | Van Os | G06F 16/73 725/38 |
| 2016/0163314 A1* | 6/2016 | Fujii | G10L 15/1822 704/275 |
| 2017/0357521 A1* | 12/2017 | Paek | G06F 3/04817 |
| 2018/0046470 A1* | 2/2018 | de Oliveira | G06F 9/451 |
| 2018/0101927 A1* | 4/2018 | Tan | G06Q 50/30 |
| 2018/0366118 A1* | 12/2018 | Lovitt | G06F 16/635 |

FOREIGN PATENT DOCUMENTS

| | | |
|---|---|---|
| CN | 103024530 A | 4/2013 |
| CN | 104021373 A | 9/2014 |
| CN | 104751842 A | 7/2015 |
| CN | 105070288 A | 11/2015 |

OTHER PUBLICATIONS

Fujimura, H., "Simultaneous Gender Classification and Voice Activity Detection Using Deep Neural Networks," Interspeech 2014, Sep. 14, 2014, pp. 1139-1143 (5 pages).

Huang, H. et al., "An Investigation of Augmenting Speaker Representations to Improve Speaker Normalisation for DNN-Based Speech Recognition," 2015 IEEE International Conference on Acoustics, Speech and Signal Processing (ICASSP), IEEE, Apr. 19, 2015, pp. 4610-4613 (4 pages).

Olive, J.P., "The Voice User Interface," 1999 IEEE Global Telecommunications—Globecom '99, IEEE, Dec. 5, 1999, pp. 2051-2055 (5 pages).

Rao, K.S., "Role of Neural Network Models for Developing Speech Systems," Sadhana, vol. 36, Part 5, Oct. 2011, pp. 783-836 (54 pages).

Serizel, R., "Vocal Tract Length Normalisation Approaches to DNN-Based Children's and Adults' Speech Recognition," 2014 IEEE Spoken Language Technology Workshop (SLT), IEEE, Dec. 7, 2014, pp. 135-140 (6 pages).

Shi, Y. et al., "Contextual Spoken Language Understanding Using Recurrent Neural Networks," 2015 IEEE International Conference on Acoustics, Speech and Signal Processing (ICASSP), IEEE, Apr. 19, 2015, pp. 5271-5275 (5 pages).

Stuhlsatz, A. et al., "Deep Neural Networks for Acoustic Emotion Recognition: Raising the Benchmarks," 2011 IEEE International Conference on Acoustics, Speech and Signal Processing (ICASSP), IEEE, May 27, 2011, pp. 5688-5691 (4 pages).

Extended European Search Report in European Application No. EP 15897016.0, dated Jun. 4, 2018 (14 pages).

* cited by examiner

IN-VEHICLE VOICE COMMAND RECOGNITION METHOD AND APPARATUS, AND STORAGE MEDIUM

CROSS-REFERENCE TO RELATED APPLICATION

This application is a U.S. National Stage of International Application No. PCT/CN2015/095269, filed Nov. 23, 2015, which is related to and claims the priority of Chinese Patent Application No. 201510382215.9 filed by Baidu Online Network Technology (Beijing) Co., Ltd on Jul. 2, 2015, and entitled "In-Vehicle Voice Command Recognition Method and Apparatus," both of which are incorporated herein by reference in their entireties.

TECHNICAL FIELD

Embodiments of the present disclosure relate to the field of computer data processing technology, and particularly to an in-vehicle voice command recognition method and apparatus, and a storage medium.

BACKGROUND

With the development of the automobile industry and the maturation of the electronic market, in-vehicle intelligent terminal has gradually become an important ancillary device for the automobile. In recent years, the prosperous economy also leads to a sharp increase in the number of cars in China. One's travel habits also change accordingly, and more and more time is spent in the car. As a result, the functions of the in-vehicle intelligent terminal have also changed from simple driving navigation to multiple functions.

Among the numerous functions developed recently, the recognition and implementation of voice commands are highly conspicuous. However, because of the limited set of commands provided on an existing in-vehicle intelligent terminal, the voice command from a user often cannot be recognized accurately. For example, the recognition rate for a voice command in Mandarin Chinese by an existing in-vehicle intelligent terminal is high, but low for a voice command in local dialect. Due to the low adaptability to different accents of the users, the recognition rate is low, causing impediments to the users during the use. Consequently, the practical utilization rate by the user for the voice command recognition function of the in-vehicle intelligent terminal is quite low.

SUMMARY

In view of the above technical problems, embodiments of the present disclosure provide an in-vehicle voice command recognition method and apparatus, and a storage medium, to improve the correct recognition rate of voice commands.

In a first aspect, an embodiment of the present disclosure provides an in-vehicle voice command recognition method. The method comprises: acquiring a voice command inputted by a user; acquiring a voice command inputted by a user; determining basic information of the user according to a pre-trained deep neural network (DNN) model; recognizing contents of the voice command according to the basic information of the user, and determining at least one potential user intention according to the identified contents and a scenario page context at the time when the user inputs the voice command; determining a confidence level of the potential user intention according to the DNN model; determining a real user intention from the potential user intention according to the confidence level; and executing a corresponding action according to the real user intention.

In a second aspect, an embodiment of the present disclosure further provides an in-vehicle voice command recognition apparatus. The apparatus comprises: a command acquisition module, configured to acquire a voice command inputted by a user; a basic information determination module, configured to determine basic information of the user according to a pre-trained deep neural network (DNN) model; a user intention recognition module, configured to identify contents of the voice command according to the basic information of the user, and determine at least one potential user intention according to the identified contents and a scenario page context at the time when the user inputs the voice command; a confidence level determination module, configured to determine a confidence level of the potential user intention according to the DNN model; an intention determination module, configured to determine a real user intention from the potential user intention according to the confidence level; and an action execution module, configured to execute a corresponding action according to the real user intention.

In a third aspect, an embodiment of the present disclosure provides a storage medium comprising computer executable instructions, the computer executable instructions are configured to execute an in-vehicle voice command recognition method when executed by a computer processor. The method comprises: acquiring a voice command inputted by a user; determining basic information of the user according to a pre-trained deep neural network (DNN) model; identifying contents of the voice command according to the basic information of the user, and determining at least one potential user intention according to the identified contents and a context of a page at the time when the user inputs the voice command; determining a confidence level of the potential user intention according to the DNN model; determining a real user intention from the potential user intention according to the confidence level; and executing a corresponding action according to the real user intention.

According to the in-vehicle voice command recognition method, apparatus and the storage medium provided in the embodiments of the present disclosure, basic information of a user is acquired by using a pre-trained deep neural network (DNN) model, a potential user intention is determined according to a scene page context at the time when the user inputs the voice command, the confidence level of the potential user intention is calculated by using the DNN model, and finally a real user intention is determined according to the confidence level and a corresponding operation is executed, whereby the correct recognition rate of voice commands of the user is effectively improved.

BRIEF DESCRIPTION OF THE DRAWINGS

In order to more clearly describe the technical solutions in the embodiments of the present disclosure, the drawings needed in the description of the embodiments will be briefly described hereinafter. It should be apparent that the drawings in the following description are merely embodiments of the present disclosure, modifications and replacement can be made thereto by those skilled in the art without creative efforts.

DETAILED DESCRIPTION OF EMBODIMENTS

The technical solutions in the embodiments of the present disclosure will be described in detail below with reference to the accompanying drawings. Clearly, the embodiments described herein are merely a part rather than all of the embodiments of the present disclosure, are provided to explain the principles of the relevant disclosure, and are not intended to limit the present disclosure. All other embodiments made based on embodiments in the present disclosure by those of ordinary skill in the art without creative efforts are covered in the protection scope of the present disclosure.

First Embodiment

A technical solution of an in-vehicle voice command recognition method is provided in this embodiment. This technical solution can be executed by an in-vehicle voice command recognition apparatus. The in-vehicle voice command recognition apparatus may be integrated in a server at the network side. The server receives a voice command inputted by a user on a vehicular machine through the Internet, processes the received voice command, and instructs the vehicular machine about the next action to be executed through the Internet according to the processing result. The in-vehicle voice command recognition apparatus may also be integrated in a computing device at the terminal side. In this case, the computing device does not need to acquire the voice command through the Internet.

Figure 1:
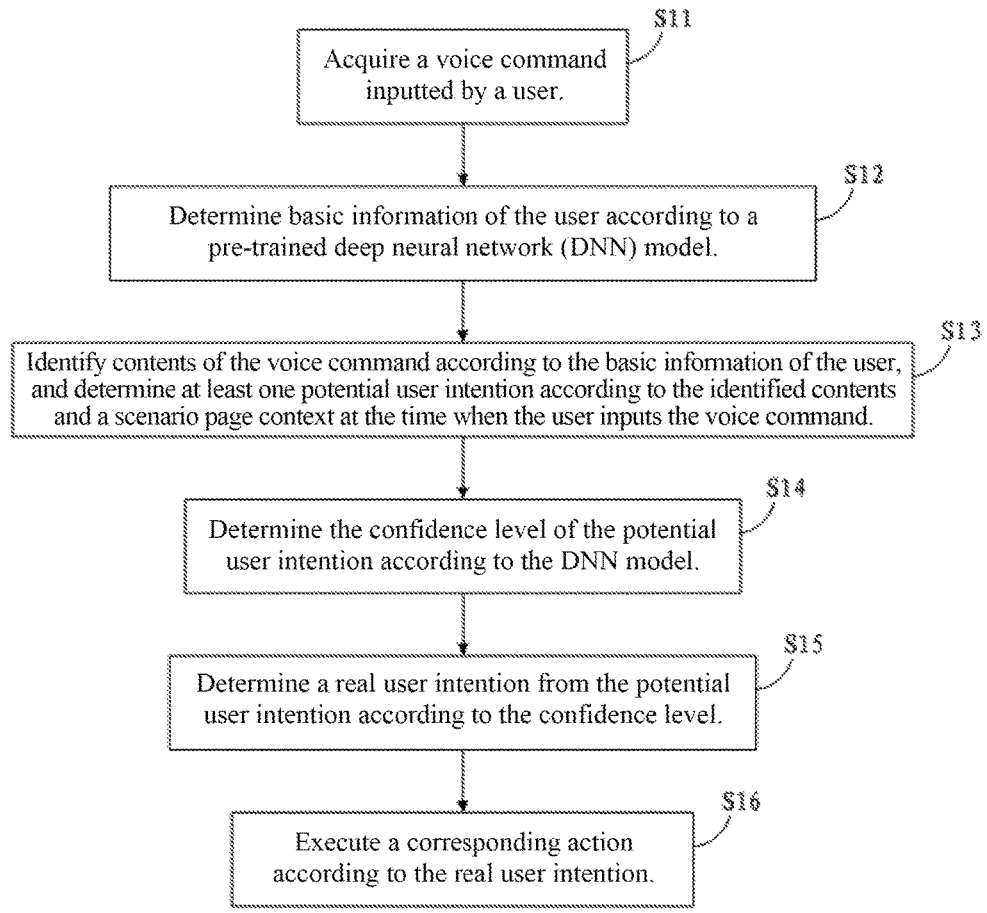
FIG. 1 is a flow chart of an in-vehicle voice command recognition method provided by a first embodiment of the present disclosure.

Specifically, referring to FIG. 1, an in-vehicle voice command recognition method comprises the following.

S11: Acquire a voice command inputted by a user.

With the arising of the concept of Internet of Vehicles, cars are generally provided with a vehicular machine having network connection function, and a user can input a voice command through the vehicular machine arranged inside the car. The voice command may indicate a next operation to be implemented by the vehicular machine as required by the user. For example, if the voice command is to "review Jay Chou's songs", then the vehicular machine will implements an action of playing all Jay Chou's songs in the next step.

S12: Determine basic information of the user according to a pre-trained deep neural network (DNN) model.

In this embodiment, some basic information of the user needs to be determined according to the voice inputted by the user. The basic information includes the time at which the voice command is inputted, the position where the voice command is inputted, and the age, gender, place of origin, and even the occupation of the user implementing the voice input action.

In order to unify the storage and parsing of the above basic information, a "persona" of the user is defined. The "persona" is a profile-type data structure for storing the basic information. The attribute of each kind of the basic information of the user is stored as a field of the "persona".

In order to determine the basic information of the user according to the voice inputted by the user, a DNN model needs to be pre-trained. During the training process, the zero-crossing rate, the short-time energy, the cepstral coefficient, the base frequency, and other characteristics in a trained voice are extracted as characteristic parameters of the trained voice, and then inputted to the DNN model as input parameters. Model parameters of the DNN model are determined according to the difference between output parameters of the DNN model and annotation parameters of the trained voice. After training, the basic information of the user including the age, gender, place of origin, and occupation etc. can be accurately determined by the DNN model according to the characteristics of the input voice after the voice inputted by the user is received.

S13: Identify contents of the voice command according to the basic information of the user, and determine at least one potential user intention according to the identified contents and a scenario page context when the user inputs the voice command.

The recognition of the contents of the voice command is the speech recognition of the voice command. The speech recognition of the voice command is speech recognition made with reference to the basic information of the user. For example, the speech recognition of the voice command of the user may be made with reference to the place-of-origin attribute and the accent characteristic in the region corresponding to the place of origin of the user.

After completing the recognition of the contents of the voice command, a potential user intention of the voice command is further determined. The potential user intention is the potential purpose of the user when he inputs the voice command.

The potential user intention corresponds to at least one operation needed to be implemented by the vehicular machine in a next step. For example, a potential user intention obtained after the intention recognition of the voice command to "review Jay Chou's songs" corresponds to the operations of selecting Jay Chou's songs and playing the selected songs by the vehicular machine.

S14: Determine the confidence level of the potential user intention according to the DNN model.

After at least one potential user intention of the voice command inputted by the user is determined, the confidence level of each potential user intention is determined according to the DNN model. Further, the confidence level of different potential user intentions can be obtained by analyzing the recognition result of the content of the voice command, and inputting the result to the DNN model.

S15: Determine a real user intention from the potential user intention according to the confidence level.

It should be understood that after the confidence level determination operation, different potential user intentions correspond to different confidence levels. In this case, a potential user intention with a confidence level best matched with a predetermined confidence interval is selected from the potential user intentions and used as a real user intention corresponding to the voice command.

S16: Execute a corresponding action according to the real user intention.

After the real user intention is determined, an action corresponding to the real user intention is executed. The action may be playing an audio, playing a video, displaying pictures, or opening a webpage.

In this embodiment, a voice command inputted by a user is acquired; basic information of the user is determined according to a pre-trained deep neural network (DNN) model; contents of the voice command are identified according to the basic information of the user, and at least one potential user intention is determined according to the identified contents and a scenario page context at the time when the user inputs the voice command; the confidence level of the potential user intention is determined according to the DNN model; a real user intention is determined from the potential user intention according to the confidence level; and a corresponding action is executed according to the real user intention, whereby the correct recognition rate of voice commands is effectively improved.

Second Embodiment

On the basis of the aforementioned embodiment of the present disclosure, this embodiment further provides a technical solution for determining basic information in the in-vehicle voice command recognition method. In the technical solution, the determination of basic information of the user according to a pre-trained deep neural network (DNN) model comprises: extracting a voice characteristic parameter from the voice command, the voice characteristic parameter comprises at least one of a zero-crossing rate, short-time energy, a cepstral coefficient, and a base frequency; and determining basic information of the user using the voice characteristic parameter, the position and the time as input parameters to the DNN, and according to output parameters from the DNN, the basic information comprising at least one of the gender, age, place of origin, and occupation of the user.

Figure 2:
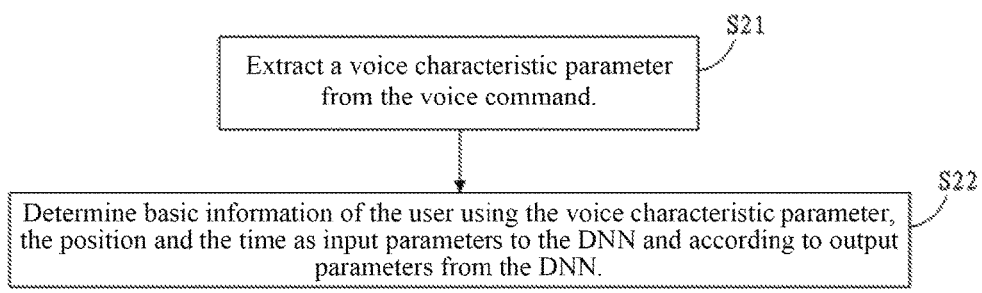
FIG. 2 is a flow chart of determining basic information in an in-vehicle voice command recognition method provided by a second embodiment of the present disclosure.

Referring to FIG. 2, the determination of basic information of the user according to a pre-trained DNN model comprises:

S21: Extract a voice characteristic parameter from the voice command.

Several voice characteristic parameters may be extracted from the voice command inputted by the user. The voice characteristic parameters include at least one of a zero-crossing rate, short-time energy, a cepstral coefficient, and a base frequency. The voice characteristic parameters extracted from the voice command can be inputted, as characteristics of the voice command, to the DNN model.

S22: Determine basic information of the user using the voice characteristic parameter, the position and the time as input parameters to the DNN, and according to output parameters from the DNN.

The DNN is a model obtained by pre-training according to the DNN theory and used to determine the basic information of the user. The basic information includes the gender, age, place of origin, and occupation of the user.

The DNN comprises an input layer, a hidden layer, and an output layer. The input layer is configured to receive an input parameter. The output layer is configured to output an operation result. The hidden layer is configured to calculate the operation result according to the value of the input parameter.

The input parameters include the voice characteristic parameter, the position where the user locates when the voice command is inputted, and the time at which the voice command is inputted. After the input parameters are inputted to the DNN, a determination result for the basic information of the user can be obtained based on the calculation of the input layer, the hidden layer, and the output layer.

More preferably, the input parameters may also include a called user recognition number (CUID). The CUID is of important reference value in determining the basic information such as the gender and age of the user.

In this embodiment, a voice characteristic parameter is extracted from the voice command, and basic information of the user is determined using the voice characteristic parameter, the position and the time as input parameters to the DNN and according to output parameters from the DNN, thereby accomplishing the determination of the basic information of the user through the DNN.

Third Embodiment

On the basis of the aforementioned embodiment of the present disclosure, this embodiment further provides a technical solution of the in-vehicle voice command recognition method. In the technical solution, the recognition of contents of the voice command according to the basic information of the user, and the determination of at least one potential user intention according to the identified contents and a scenario page context at the time when the user inputs the voice command comprise: acquiring pages appeared within a predetermined length of time before the user inputs the voice command, and determining a potential user intention according to the pages appeared within the predetermined length of time, the halt duration of each page, and critical voice recognition information in the voice command.

Figure 3:
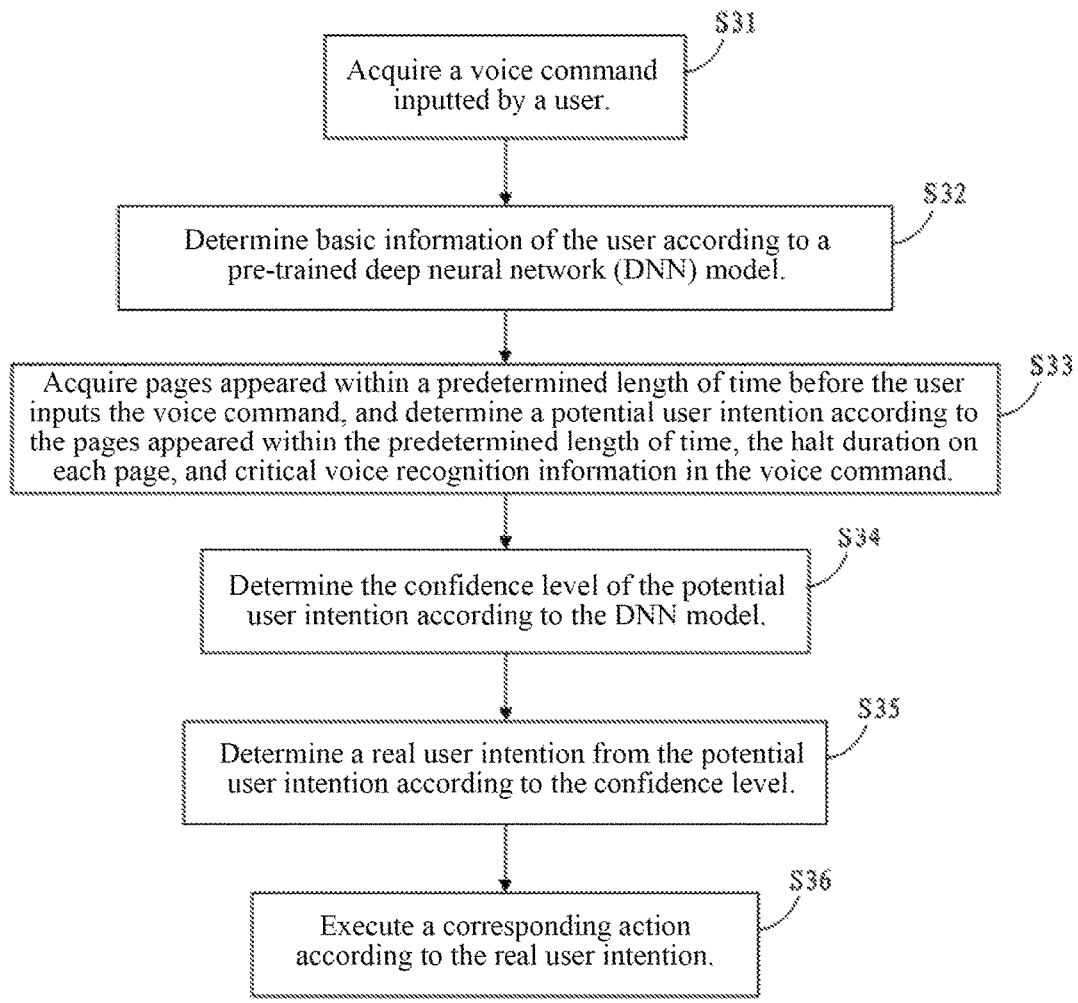
FIG. 3 is a flow chart of an in-vehicle voice command recognition method provided by a third embodiment of the present disclosure.

Referring to FIG. 3, the in-vehicle voice command recognition method comprises the following.

S31: Acquire a voice command inputted by a user.

S32: Determine basic information of the user according to a pre-trained deep neural network (DNN) model.

S33: Acquire pages appeared within a predetermined length of time before the user inputs the voice command, and determine a potential user intention according to the pages appeared within the predetermined length of time, the halt duration of each of the pages, and critical voice recognition information in the voice command.

A session object may be set, and pages appeared within the predetermined length of time before the user inputs the voice command and the halt duration of the user on the appeared pages are stored in the session object. When a potential user intention needs to be determined, the potential user intention is determined comprehensively according to the pages appeared within the predetermined length of time before the user inputs the voice command and the halt duration of the user in each of the page acquired from the session object, in combination with the recognition voice material of the voice command.

For example, empirically, if the page appeared within a predetermined length of time of 3 min is a map navigation page, the halt duration of the user on the map navigation page is 3 minutes, and the recognition voice material comprises the key word "navigation", then a practical intention of the user may be probably to re-plan the navigation route. In case of the above situation, re-planning the navigation route is determined as a potential user intention.

S34: Determine the confidence level of the potential user intention according to the DNN model.

S35: Determine a real user intention from the potential user intention according to the confidence level.

S36: Execute a corresponding action according to the real user intention.

In this embodiment, after the basic information of the user is determined, pages appeared within a predetermined length of time before the user inputs the voice command are acquired, and a potential user intention is determined according to the pages appeared within the predetermined length of time, the halt duration of each of the pages, and critical voice recognition information in the voice command, thereby accomplishing the accurate determination of potential user intentions.

Fourth Embodiment

On the basis of the aforementioned embodiment of the present disclosure, this embodiment further provides a technical solution of the in-vehicle voice command recognition method. In the technical solution, the recognition of contents of the voice command according to the basic information of the user, and the determination of at least one potential user intention according to the identified contents and a scenario page context at the time when the user inputs the voice command comprise: acquiring a predetermined number of pages appearing before the user inputs the voice command, and determining a potential user intention according to the predetermined number of appeared pages, the halt duration of each of the pages, and critical voice recognition information in the voice command.

Figure 4:
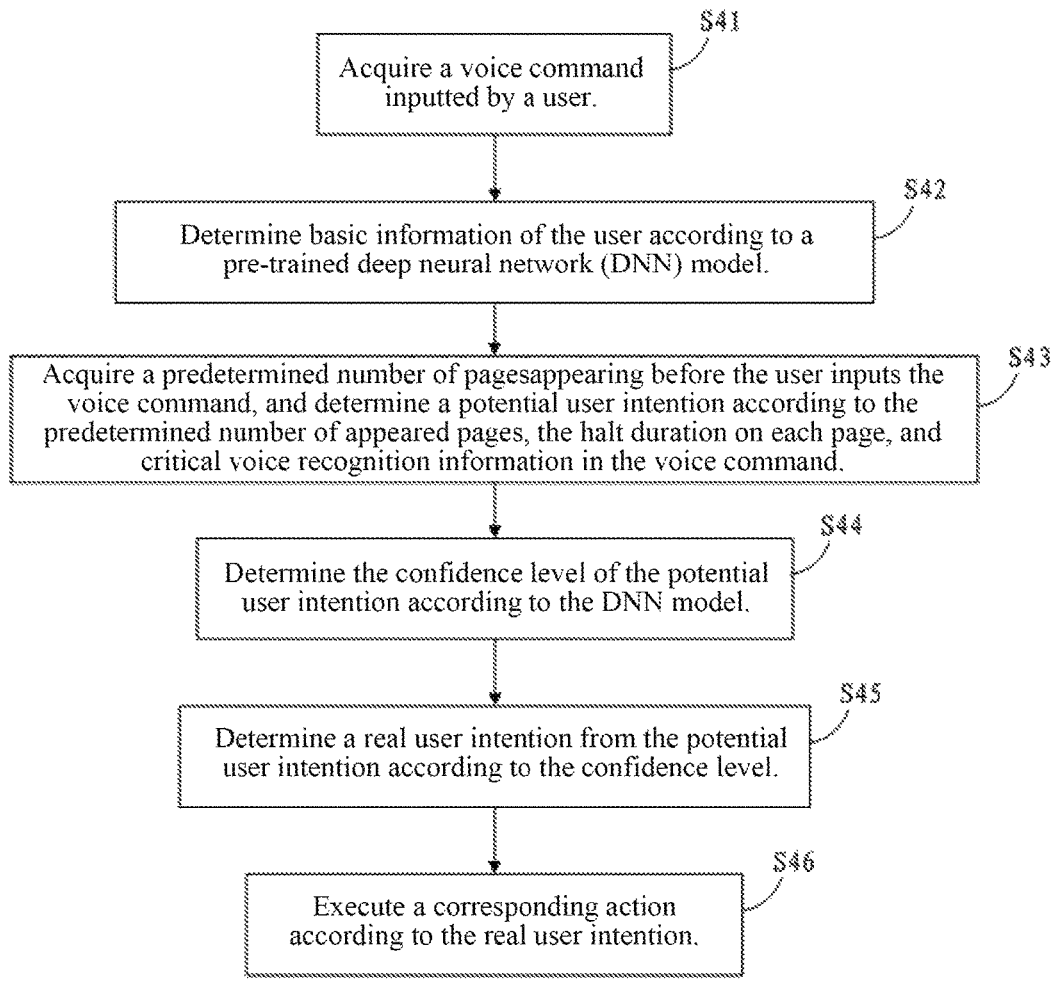
FIG. 4 is a flow chart of an in-vehicle voice command recognition method provided by a fourth embodiment of the present disclosure.

Referring to FIG. 4, the in-vehicle voice command recognition method comprises:

S41: Acquire a voice command inputted by a user.

S42: Determine basic information of the user according to a pre-trained deep neural network (DNN) model.

S43: Acquire a predetermined number of pages appearing before the user inputs the voice command, and determine a potential user intention according to the predetermined number of appeared pages, the halt duration of each of the pages, and critical voice recognition information in the voice command.

Same as described in the Third Embodiment of the present disclosure, a session object may be set, and a predetermined number of pages appearing before the user inputs the voice command and the halt duration of the user on the appeared pages are stored in the session object. When a potential user intention needs to be determined, the potential user intention is determined comprehensively according to the previously stored page and halt duration parameters acquired from the session object, in combination with the recognition voice material of the voice command.

For example, the two pages appearing before the voice command is inputted are respectively a music playing page and a map navigation page. The halt durations of the user on the music playing page and on the map navigation page are 3 minutes, and 2 to 10 minutes respectively, and the recognition voice material comprises the key word "navigation." Empirically, a practical intention of the user in this situation may likely be to plan the navigation route anew. In case of the above situation, re-planning the navigation route is determined as a potential user intention.

S44: Determine the confidence level of the potential user intention according to the DNN model.

S45: Determine a real user intention from the potential user intention according to the confidence level.

S46: Execute a corresponding action according to the real user intention.

In this embodiment, after the basic information of the user is determined, a predetermined number of pages appearing before the user inputs the voice command are acquired, and a potential user intention is determined according to the predetermined number of appeared pages, the halt duration of each of the pages, and critical voice recognition information in the voice command, thereby accomplishing the accurate determination of potential user intentions.

Fifth Embodiment

On the basis of the aforementioned embodiment of the present disclosure, this embodiment further provides a technical solution for confidence level determination in the in-vehicle voice command recognition method. In the technical solution, the determination of the confidence level of the potential user intention according to the DNN model comprises: evaluating an emotional state of the user at the time when he inputs the voice command by using the DNN model using the voice characteristic parameter of the voice command as an input parameter; and obtaining the confidence level of the potential user intention according to the emotional state.

Figure 5:
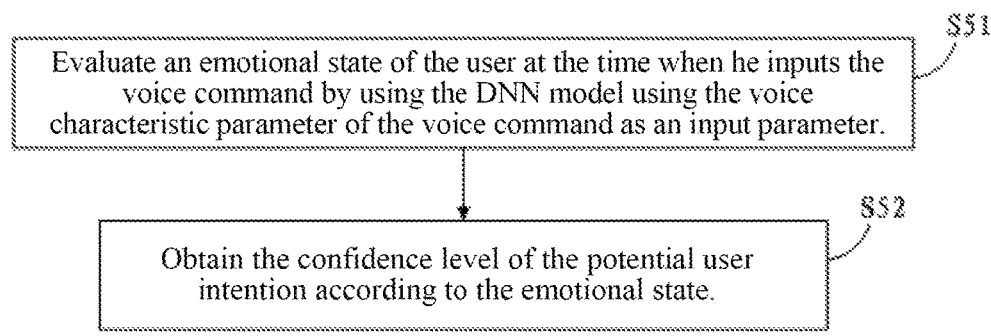
FIG. 5 is a flow chart of confidence level determination in an in-vehicle voice command recognition method provided by a fifth embodiment of the present disclosure.

Referring to FIG. 5, the determination of the confidence level of the potential user intention according to the DNN model comprises:

S51: Evaluate an emotional state of the user at the time when he inputs the voice command by using the DNN model using the voice characteristic parameter of the voice command as an input parameter.

The DNN model can be used not only to determine the basic information of the user, but also to evaluate the emotional state of the user at the time when he inputs the voice command in determining the confidence level of the potential user intention.

Specifically, several potential emotional states of the user may be defined previously. For example, the emotional state of the user may include happy, sad, angry, and others. After the emotional state of the user is determined, output units corresponding to different emotional states are arranged on the output layer of the DNN model. In this manner, the DNN can be used in the evaluation of the emotional state after the training of the DNN is completed.

S52: Obtain the confidence level of the potential user intention according to the emotional state.

Specifically, the value of the confidence level corresponding to a different emotional state of the user may be designated based on empirical values. For example, the value of the confidence level is the highest when the emotional state is empirically designated to be happy. The value of the confidence level is the lowest when the emotional state is empirically designated to be sad.

In this embodiment, an emotional state of the user at the time when he inputs the voice command is evaluated by using the DNN model using the voice characteristic parameter of the voice command as an input parameter, and the confidence level of the potential user intention is obtained according to the emotional state. Therefore, the emotional state of the user at the time when he inputs the voice command is evaluated by using the DNN model and the confidence level of the potential user intention is further determined according to the emotional state.

Sixth Embodiment

On the basis of the aforementioned embodiment of the present disclosure, this embodiment further provides a technical solution for intention determination in the in-vehicle voice command recognition method. In the technical solution, the determination of a real user intention from the potential user intention according to the confidence level comprises: matching the confidence level with a confidence interval corresponding to the potential user intention; and determining a potential user intention in the confidence interval best matched with the confidence level as the real user intention.

Figure 6:
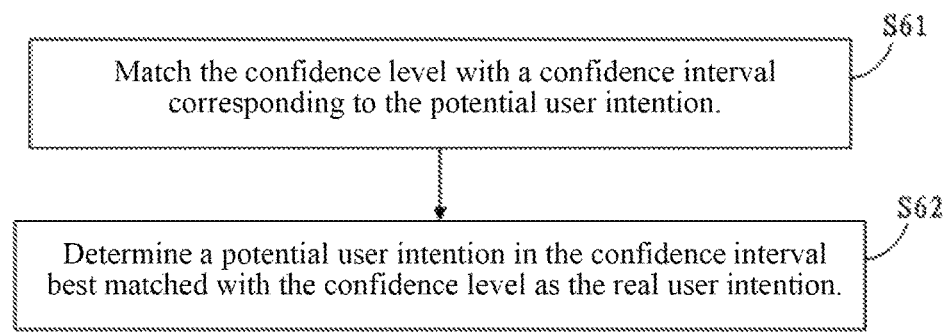
FIG. 6 is a flow chart of intention determination in an in-vehicle voice command recognition method provided by a sixth embodiment of the present disclosure.

Referring to FIG. 6, the determination of a real user intention from the potential user intention according to the confidence level comprises:

S61: Match the confidence level with a confidence interval corresponding to the potential user intention.

Each potential intention corresponds to a respective confidence interval. For example, a confidence interval of the potential intention to "re-plan the navigation route" is between 0.45 to 0.6. Confidence intervals corresponding to each potential intention are acquired first. The confidence levels are matched to each acquired confidence interval, after the potential intention corresponding to the voice command and the confidence level of the potential intention are obtained.

More preferably, the potential intention, that is, the potential user intention, may also additionally include corresponding parameters. For example, the intention to "change the play mode" may additionally have parameters including loop play, sequential play, random play and other target play modes. In this case, each of the additionally included parameters is used as an independent solution, a confidence interval corresponding thereto is acquired separately, and after the confidence level is obtained, the confidence level is matched with the acquired confidence interval separately.

S62: Determine a potential user intention in the confidence interval best matched with the confidence level as the real user intention.

After matching with the confidence interval, a potential intention in the confidence interval best matched is determined as the real user intention.

In this embodiment, the confidence level is matched with a confidence interval corresponding to the potential user intention, and a potential intention in the confidence interval best matched with the confidence level is determined as the real user intention, thus accomplishing the recognition of a real user intention according to the parameter confidence level.

Seventh Embodiment

On the basis of the aforementioned embodiment of the present disclosure, this embodiment further provides a technical solution for action execution in the in-vehicle voice command recognition method. In the technical solution, the execution of a corresponding action according to the real user intention comprises: if the execution condition of the real user intention is satisfied, executing an action corresponding to the real user intention; if the execution condition of the real user intention is unsatisfied, terminating the execution of an action corresponding to the real user intention, and alerting the user; and if the execution condition of the real user intention is uncertain, executing an action similar to that corresponding to the real user intention.

Figure 7:
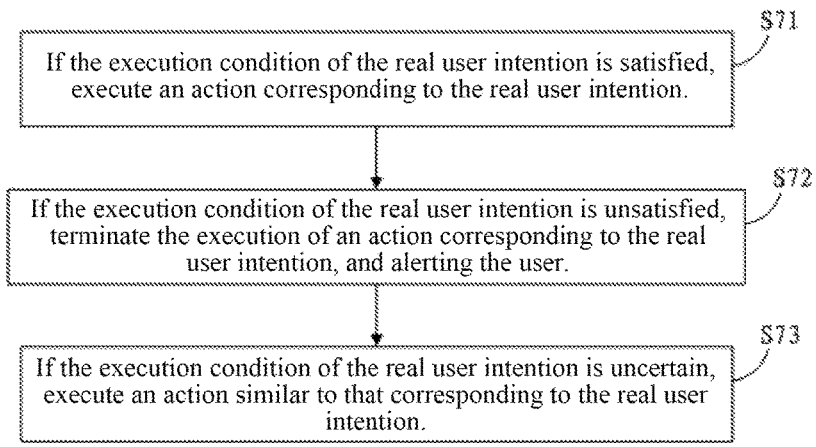
FIG. 7 is a flow chart of action execution in an in-vehicle voice command recognition method provided by a seventh embodiment of the present disclosure.

Referring to FIG. 7, the execution of a corresponding action according to the real user intention comprises:

S71: If the execution condition of the real user intention is satisfied, execute an action corresponding to the real user intention.

After the real user intention is determined, whether to execute an action corresponding to the real intention depends on whether the execution condition of the real intention is satisfied. For example, the real intention is to "view the WeChat", the corresponding execution condition should be that the car is in a stopped state. If a voice command is received and a real intention to "view the WeChat" is recognized at the time when the car is in a stopped state, an action corresponding to the real intention is executed, that is, to view the WeChat.

S72: If the execution condition of the real user intention is unsatisfied, terminate the execution of an action corresponding to the real user intention, and alerting the user.

Taking the real intention to "view the WeChat" as an example, if a voice command is received and the real intention to "view the WeChat" is recognized at the time when the car is in a driving state, then the action of viewing the WeChat is not executed, and the user is alerted to the danger of executing such an action in the current state by means of a message.

S73: If the execution condition of the real user intention is uncertain, execute an action similar to that corresponding to the real user intention.

When the emotional state of the user is less good, or the real user intention cannot be determined clearly, the recognition of the execution condition of the real user intention may be uncertain. In this case, an action similar to that corresponding to the real user intention is executed. However, it is important to ensure that the similar action is safe.

In this embodiment, when the execution condition of the real user intention is satisfied, an action corresponding to the real user intention is executed; when the execution condition of the real user intention is unsatisfied, the execution of an action corresponding to the real user intention is terminated; and when the execution condition of the real user intention is uncertain, an action similar to that corresponding to the real user intention is executed, whereby the safety of the action executed is ensured through the secondary determination of the execution condition.

Eighth Embodiment

This embodiment provides a technical solution of the in-vehicle voice command recognition method. In the technical solution, the in-vehicle voice command recognition method comprises: determining basic information of a user; acquiring a potential user intention according to session processing; acquiring the confidence level of different potential user intentions according to intention confidence level processing; determining an action to be executed according to safety processing; and determining whether to execute the corresponding action according to a result of comprehensive determination.

Figure 8:
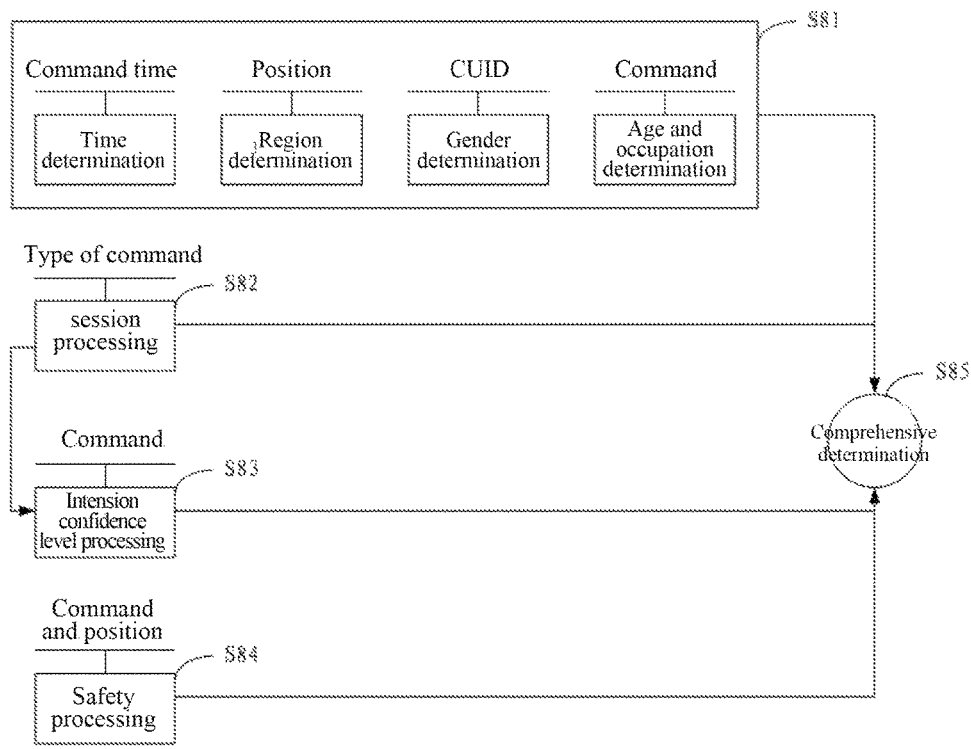
FIG. 8 is a schematic flow chart of an in-vehicle voice command recognition method provided by an eighth embodiment of the present disclosure.
Figure 9:
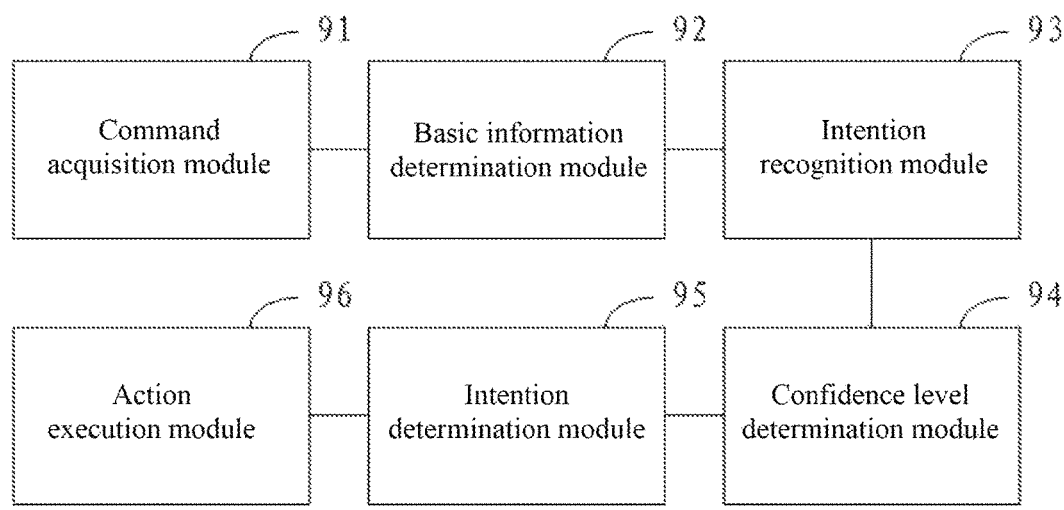
FIG. 9 is a structural diagram of an in-vehicle voice command recognition apparatus provided by a ninth embodiment of the present disclosure.

Referring to FIG. 8, the in-vehicle voice command recognition method comprises:

S81: Determine basic information of a user.

In this embodiment, basic information of a user is identified through a pre-trained DNN. The basic information includes the age, gender, place of origin, and occupation etc. of the user.

S82: Acquire a potential user intention according to session processing.

A potential user intention is acquired according to pages stored in a session object once used by the user before he gives a voice command.

S83: Acquire the confidence level of different potential user intentions according to intension confidence level processing.

In this embodiment, the confidence level of different potential intentions is identified according to the pre-trained DNN.

S84: Determine an action to be executed according to safety processing.

Whether an action to be executed is a safe action is determined through the recognition of a current state of the car, to further determine the action to be executed.

S85: Determine whether to execute the corresponding action according to a result of comprehensive determination.

Whether to execute the corresponding action is determined according to comprehensive determination of the results obtained in preceding steps.

In this embodiment, basic information of a user is determined; a potential user intention is acquired according to session processing; the confidence level of different potential user intentions is acquired according to intension confidence level processing; an action to be executed is determined according to safety processing; and whether to execute the corresponding action is determined according to a result of comprehensive determination, thus completing the whole process from the acquisition of a voice command to the execution of a corresponding action.

Ninth Embodiment

This embodiment provides a technical solution of an in-vehicle voice command recognition apparatus. In the technical solution, the in-vehicle voice command recognition apparatus includes a command acquisition module 91, a basic information determination module 92, a user intention recognition module 93, a confidence level determination module 94, an intention determination module 95, and an action execution module 96.

The command acquisition module 91 is configured to acquire a voice command inputted by a user.

The basic information determination module 92 is configured to determine basic information of the user according to a pre-trained deep neural network (DNN) model.

The user intention recognition module 93 is configured to identify contents of the voice command according to the basic information of the user, and determine at least one potential user intention according to the identified contents and a scenario page context at the time when the user inputs the voice command.

The confidence level determination module 94 is configured to determine the confidence level of the potential user intention according to the DNN model.

The intention determination module 95 is configured to determine a real user intention from the potential user intention according to the confidence level.

The action execution module 96 is configured to execute a corresponding action according to the real user intention.

Further, the basic information determination module 92 includes a characteristic extraction unit and a DNN recognition unit.

The characteristic extraction unit is configured to extract a voice characteristic parameter from the voice command. The voice characteristic parameter includes at least one of a zero-crossing rate, short-time energy, a cepstral coefficient, and a base frequency.

The DNN recognition unit is configured to determine basic information of the user using the voice characteristic parameter, the position and the time as input parameters to the DNN and according to output parameters from the DNN. The basic information includes at least one of the gender, age, place of origin, and occupation of the user.

Further, the user intention recognition module 93 includes a first intention recognition unit or a second intention recognition unit.

The first intention recognition unit is configured to acquire pages appeared within a predetermined length of time before the user inputs the voice command, and determine a potential user intention according to the pages appeared within the predetermined length of time, the halt duration of each of the pages, and critical voice recognition information in the voice command.

The second intention recognition unit is configured to acquire a predetermined number of pages appearing before the user inputs the voice command, and determine a potential user intention according to the predetermined number of appeared pages, the halt duration of each of the pages, and critical voice recognition information in the voice command.

Further, the confidence level determination module 94 includes an emotion evaluation unit and a confidence level acquisition unit.

The emotion evaluation unit is configured to evaluate an emotional state of the user at the time when he inputs the voice command by using the DNN model using the voice characteristic parameter of the voice command as an input parameter.

The confidence level acquisition unit is configured to obtain the confidence level of the potential user intention according to the emotional state.

Further, the intention determination module 95 includes a matching unit and a real intention acquisition unit.

The matching unit is configured to match the confidence level with a confidence interval corresponding to the potential user intention.

The real intention acquisition unit is configured to determine a potential user intention in the confidence interval best matched with the confidence level as the real user intention.

Further, the action execution module 96 includes a first action execution unit, a second action execution unit, and a third action execution unit.

The first action execution unit is configured to execute an action corresponding to the real user intention, when the execution condition of the real user intention is satisfied.

The second action execution unit is configured to terminate the execution of an action corresponding to the real user intention, and prompt the user, when the execution condition of the real user intention is unsatisfied.

The third action execution unit is configured to execute an action similar to that corresponding to the real user intention, when the execution condition of the real user intention is uncertain.

The in-vehicle voice command recognition apparatus can execute the in-vehicle voice command recognition method provided in any of the embodiments of the present disclosure and has corresponding function modules for and beneficial effects in executing the method.

It should be understood by those of ordinary skill in the art that all the modules or steps of the present disclosure can be implemented by universal computing devices, and can be centralized on a single computing device or distributed on a network consisting of multiple computing devices, and optionally can be implemented by program codes executable to computing devices. Therefore, all the modules or steps can be stored in a storage device to be executed by computing devices, or it can be implemented by making all the modules or steps into integrated circuit modules respectively, or making multiple modules or steps of them into a single integrated circuit module. Therefore, the present disclosure is not limited to the combination of any specific hardware and software.

Tenth Embodiment

A storage medium comprising computer executable instructions are provided. The computer executable instructions are configured to execute an in-vehicle voice command recognition method when executed by a computer processor. The method comprises the steps of:

acquiring a voice command inputted by a user;

determining basic information of the user according to a pre-trained deep neural network (DNN) model;

identifying contents of the voice command according to the basic information of the user, and determining at least one potential user intention according to the identified contents and a scenario page context at the time when the user inputs the voice command;

determining the confidence level of the potential user intention according to the DNN model;

determining a real user intention from the potential user intention according to the confidence level; and executing a corresponding action according to the real user intention.

When the method is executed by the computer processor, the determining basic information of the user according to a pre-trained deep neural network (DNN) model comprises:

extracting a voice characteristic parameter from the voice command, the voice characteristic parameter comprising at least one of a zero-crossing rate, short-time energy, a cepstral coefficient, and a base frequency; and determining basic information of the user using the voice characteristic parameter, the position and the time as input parameters to the DNN and according to output parameters from the DNN, the basic information comprising at least one of the gender, age, place of origin, and occupation of the user.

When the method is executed by the computer processor, the recognizing contents of the voice command according to the basic information of the user and the determining at least one potential user intention according to the identified contents and a scenario page context at the time when the user inputs the voice command comprise:

acquiring pages appeared within a predetermined length of time before the user inputs the voice command, and determining a potential user intention according to the pages appeared within the predetermined length of time, the halt duration of each of the pages, and critical voice recognition information in the voice command; or acquiring a predetermined number of pages appearing before the user inputs the voice command, and determining a potential user intention according to the predetermined number of appeared pages, the halt duration of each of the pages, and critical voice recognition information in the voice command.

When the method is executed by the computer processor, the determining the confidence level of the potential user intention according to the DNN model comprises:

evaluating an emotional state of the user at the time when he inputs the voice command by using the DNN model using the voice characteristic parameter of the voice command as an input parameter; and obtaining the confidence level of the potential user intention according to the emotional state.

When the method is executed by the computer processor, the determining a real user intention from the potential user intention according to the confidence level comprises:

matching the confidence level with a confidence interval corresponding to the potential user intention; and determining a potential user intention in the confidence interval best matched with the confidence level as the real user intention.

When the method is executed by the computer processor, the executing a corresponding action according to the real user intention comprises:

if the execution condition of the real user intention is satisfied, executing an action corresponding to the real user intention;

if the execution condition of the real user intention is unsatisfied, terminating the execution of an action corresponding to the real user intention, and alerting the user; and if the execution condition of the real user intention is uncertain, executing an action similar to that corresponding to the real user intention.

According to the descriptions of the foregoing embodiments, it should be apparent to those skilled in the art that the present disclosure may be implemented by means of software and required general hardware, or naturally only by hardware, however, the former is preferred in many situations. Based on such understanding, the technical solutions in the present disclosure essentially, or the part contributing to the conventional art may be implemented in the form of a software product. The computer software product may be stored in a computer readable storage medium, such as a magnetic disk, an optical disc, a read-only memory (ROM), or a random access memory (RAM), and includes several instructions for instructing a computer device (which may be a personal computer, a server, a network device, or the like) to perform the method described in the embodiments of the present disclosure.

It should be noted that in the embodiments of the in-vehicle voice command recognition apparatus, the units and modules included are divided merely in accordance with functional logics. However, the division is not limited as above, rather permissible as long as corresponding functions can be implemented. Moreover, specific names of the functional units are provided only for ease of distinction, and not intended to limit the protection scope of the present disclosure.

The foregoing is only a description of the specific embodiments of the present disclosure. However, the present disclosure is not limited thereto. Changes or replacements easily conceived by those skilled in the art in the technical scope disclosed herein fall within the protection scope of the present disclosure as defined by the appended claims.

The embodiments in the specification are described using a progressive approach. Each embodiment focuses on differences from other embodiments. For same or similar parts in the embodiments, references may be made to each other.

The foregoing is only a description of the specific embodiments of the present disclosure. However, the present disclosure is not limited thereto. Changes or replacements easily occurring to those skilled in the art in the technical scope disclosed herein fall within the protection scope of the present disclosure as defined by the appended claims.

What is claimed is:

1. An in-vehicle voice command recognition method, comprising:

acquiring a voice command inputted by a user;

determining basic information of the user according to a pre-trained deep neural network (DNN) model;

identifying contents of the voice command according to the basic information of the user, and determining at least one potential user intention according to the identified contents and a scenario page context of a page when the user inputs the voice command;

determining a confidence level of the potential user intention according to the DNN model;

determining a real user intention from the potential user intention according to the confidence level; and executing a corresponding action according to the real user intention.

2. The method according to claim 1, wherein the determining basic information of the user according to a pre-trained deep neural network (DNN) model comprises:
- extracting a voice characteristic parameter from the voice command, the voice characteristic parameter comprising at least one of a zero-crossing rate, short-time energy, a cepstral coefficient, and a base frequency; and
- determining the basic information of the user using the voice characteristic parameter, a position and time as input parameters to the DNN and according to output parameters from the DNN, the basic information comprising at least one of a gender, an age, a place of origin, and an occupation of the user.

3. The method according to claim 1, wherein the identifying contents of the voice command according to the basic information of the user, and the determining at least one potential user intention according to the identified contents and a scenario page context when the user inputs the voice command comprise:
- acquiring pages appeared within a predetermined length of time before the user inputs the voice command, and determining a potential user intention according to the pages appeared within the predetermined length of time, halt duration of each of the pages, and critical voice recognition information in the voice command; or
- acquiring a predetermined number of pages appearing before the user inputs the voice command, and determining a potential user intention according to the predetermined number of appeared pages, the halt duration of each of the pages, and critical voice recognition information in the voice command.

4. The method according to claim 1, wherein the determining the confidence level of the potential user intention according to the DNN model comprises:
- evaluating an emotional state of the user when the user inputs the voice command by using the DNN model, and using the voice characteristic parameter of the voice command as an input parameter; and
- obtaining the confidence level of the potential user intention according to the emotional state.

5. The method according to claim 1, wherein the determining a real user intention from the potential user intention according to the confidence level comprises:
- matching the confidence level with a confidence interval corresponding to the potential user intention; and
- selecting a potential user intention in the confidence interval best matched with the confidence level as the real user intention.

6. The method according to claim 1, wherein the executing a corresponding action according to the real user intention comprises:
- if an execution condition of the real user intention is satisfied, executing an action corresponding to the real user intention;
- if the execution condition of the real user intention is unsatisfied, terminating the execution of the action corresponding to the real user intention, and alerting the user; and
- if the execution condition of the real user intention is uncertain, executing an action similar to the action corresponding to the real user intention.

7. An in-vehicle voice command recognition apparatus, comprising:
- at least one processor; and
- a memory storing instructions, the instructions when executed by the at least one processor, cause the at least one processor to perform operations, the operations comprising:
- acquiring a voice command inputted by a user;
- determining basic information of the user according to a pre-trained deep neural network (DNN) model;
- identifying contents of the voice command according to the basic information of the user, and determining at least one potential user intention according to the identified contents and a scenario page context at the time when the user inputs the voice command;
- determining a confidence level of the potential user intention according to the DNN model;
- determining a real user intention from the potential user intention according to the confidence level; and
- executing a corresponding action according to the real user intention.

8. The apparatus according to claim 7, wherein the determining basic information of the user according to a pre-trained deep neural network (DNN) model comprises:
- extracting a voice characteristic parameter from the voice command, the voice characteristic parameter comprising at least one of a zero-crossing rate, short-time energy, a cepstral coefficient, and a base frequency; and
- determining the basic information of the user using the voice characteristic parameter, a position and time as input parameters to the DNN and according toz output parameters from the DNN, the basic information comprising at least one of a gender, an age, a place of origin, and an occupation of the user.

9. The apparatus according to claim 7, wherein the identifying contents of the voice command according to the basic information of the user, and the determining at least one potential user intention according to the identified contents and a scenario page context when the user inputs the voice command comprises:
- acquiring pages appeared within a predetermined length of time before the user inputs the voice command, and determine a potential user intention according to the pages appeared within the predetermined length of time, halt duration of each of the pages, and critical voice recognition information in the voice command; and
- acquiring a predetermined number of pages appearing before the user inputs the voice command, and determine a potential user intention according to the predetermined number of appeared pages, the halt duration of each of the pages, and critical voice recognition information in the voice command.

10. The apparatus according to claim 7, wherein the determining the confidence level of the potential user intention according to the DNN model comprises:
- evaluating an emotional state of the user when the user inputs the voice command by using the DNN model, and using the voice characteristic parameter of the voice command as an input parameter; and
- obtaining the confidence level of the potential user intention according to the emotional state.

11. The apparatus according to claim 7, wherein the determining a real user intention from the potential user intention according to the confidence level comprises:
- matching the confidence level with a confidence interval corresponding to the potential user intention; and
- selecting a potential user intention in the confidence interval best matched with the confidence level as the real user intention.

12. The apparatus according to claim 7, wherein the executing a corresponding action according to the real user intention comprises:
- if an execution condition of the real user intention is satisfied, executing an action corresponding to the real user intention;
- if the execution condition of the real user intention is unsatisfied, terminating the execution of the action corresponding to the real user intention, and alerting the user; and
- if the execution condition of the real user intention is uncertain, executing an action similar to the action corresponding to the real user intention.

13. A storage medium comprising computer executable instructions, the computer executable instructions being configured to execute an in-vehicle voice command recognition method when executed by a computer processor, the method comprising:
- acquiring a voice command inputted by a user;
- determining basic information of the user according to a pre-trained deep neural network (DNN) model;
- identifying contents of the voice command according to the basic information of the user, and determining at least one potential user intention according to the identified contents and a scenario page context when the user inputs the voice command;
- determining a confidence level of the potential user intention according to the DNN model;
- determining a real user intention from the potential user intention according to the confidence level; and
- executing a corresponding action according to the real user intention.

* * * * *